United States Patent [19]

Rollitt

[11] 3,830,046

[45] Aug. 20, 1974

[54] CANE HARVESTERS

[75] Inventor: George A. Rollitt, Queensland, Australia

[73] Assignee: Massey-Ferguson (Australia) Limited, Sunshine, Australia

[22] Filed: Oct. 5, 1972

[21] Appl. No.: 295,334

[30]     Foreign Application Priority Data
         Oct. 29, 1971   Great Britain................... 50406/71

[52] U.S. Cl.................................... 56/16.5, 55/416
[51] Int. Cl............................................. A01d 45/10
[58] Field of Search ........ 56/14.3, 19.5, 16.5, 12.8; 209/138, 154; 55/413, 414, 416

[56]             References Cited
              UNITED STATES PATENTS
    970,530    9/1910    Miller ................................ 209/138

| 1,766,237 | 6/1930 | Whitmore ............................ 55/416 |
| 3,325,982 | 6/1967 | Fogels et al...................... 56/16.5 X |

FOREIGN PATENTS OR APPLICATIONS

| 1,488,540 | 6/1967 | France ................................ 56/12.8 |
| 135,717 | 6/1960 | U.S.S.R. ............................... 56/16.5 |

Primary Examiner—Louis G. Mancene
Assistant Examiner—J. N. Eskovitz
Attorney, Agent, or Firm—Robert L. Farris

[57]             ABSTRACT

A trash removal system for a chopper-type cane harvester comprising a vertical axis fan to suck trash from a cascade of cane billets and trash. The trash passes out of the machine through a discharge duct. The duct has a series of fixed helical vanes to remove the rotational component of movement of the trash.

3 Claims, 2 Drawing Figures

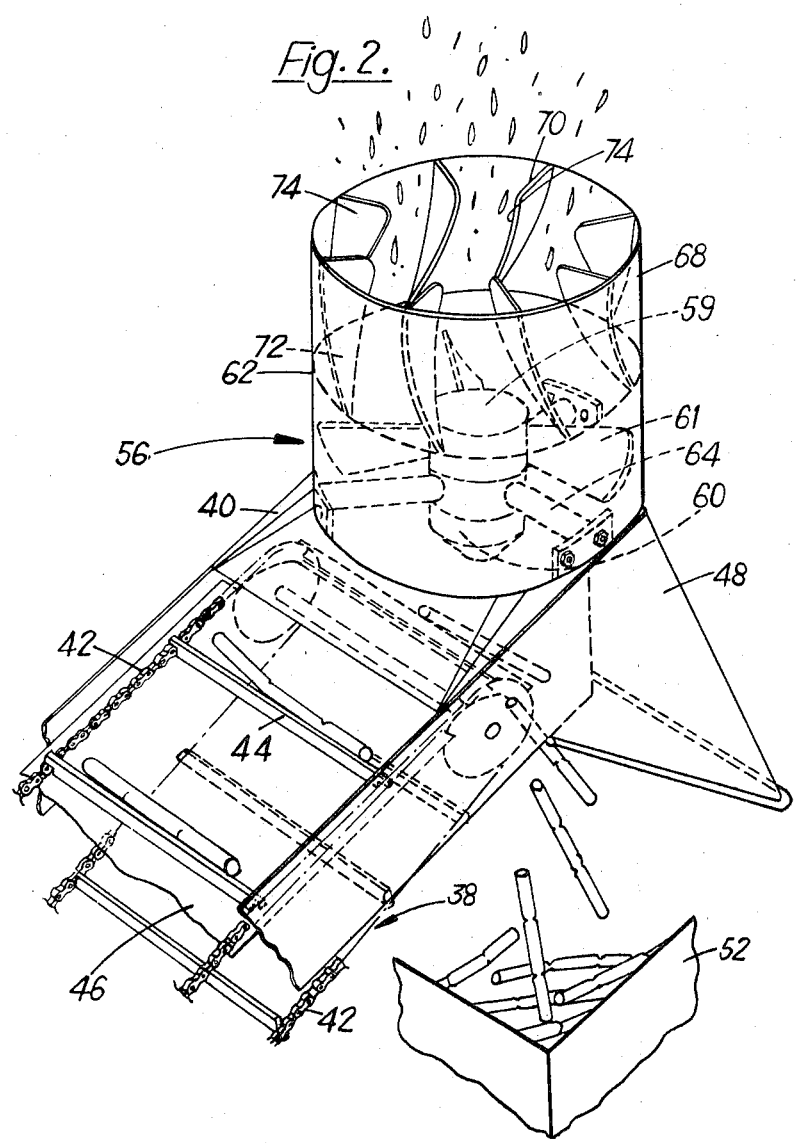

CANE HARVESTERS

This invention relates to cane harvesters and in particular to cane harvesters of the kind having cane chopping means arranged to chop or cut each cane stick into two or more pieces, together with trash extraction means incorporating a rotary element, for example a fan, arranged to cause an air flow between the cane pieces to an outlet, whereby trash is carried through the outlet. Such cane harvesters are hereafter referred to as cane harvesters of the kind stated.

A problem which arises in cane harvesters of the kind stated is that the material passing through the outlet with the air flow is not projected with a well defined trajectory with respect to the harvester.

This is not a particularly serious matter in the case of trash such as cane tops and grass which is light in weight and which despite the initial high velocity given to it by the fan (which may be in the region of 9,000 feet per minute) soon falls to the ground. However stones and pieces of chopped cane occasionally pass through the trash extractor and the result is that these bodies can be projected at an angle of about 25° with respect to the level ground so that they travel up to 100 yeards from the harvester, even though the axis of rotation of the fan is vertical. This represents a safety hazard.

An object of the invention is to provide a trash extraction system for a cane harvester in which the above problem is overcome or mitigated.

According to one aspect of the invention there is provided airflow control apparatus for use in a cane harvester of the kind stated, the apparatus being arranged to be mounted on the harvester in a position such that it intercepts the air flow produced by the rotary element and including air guide means having an air guide surface at least part of which is inclined with respect to the axis of rotation of the rotary element so as to remove at least part of the rotational component of movement given to the air flow by the rotary element.

The invention also provides a cane harvester of the kind stated comprising projection means arranged to project pieces of chopped cane into a trash removal zone, a fan having a rotary blade arranged to pass a current of air between the cane pieces as they pass through the trash removal zone, and air guide means arranged to intercept the flow of air produced by the fan, the air guide means having an air guide surface at least part of which is inclined with respect to the axis of rotation of the fan blade so as to remove at least part of the rotational component of movement given to the air flow by the fan.

An embodiment of the invention will now be described by way of example with reference to the accompanying drawings in which:

FIG. 2 shows an enlarged perspective view of part of the trash extraction apparatus of the harvester of FIG. 1.

Figure 1:
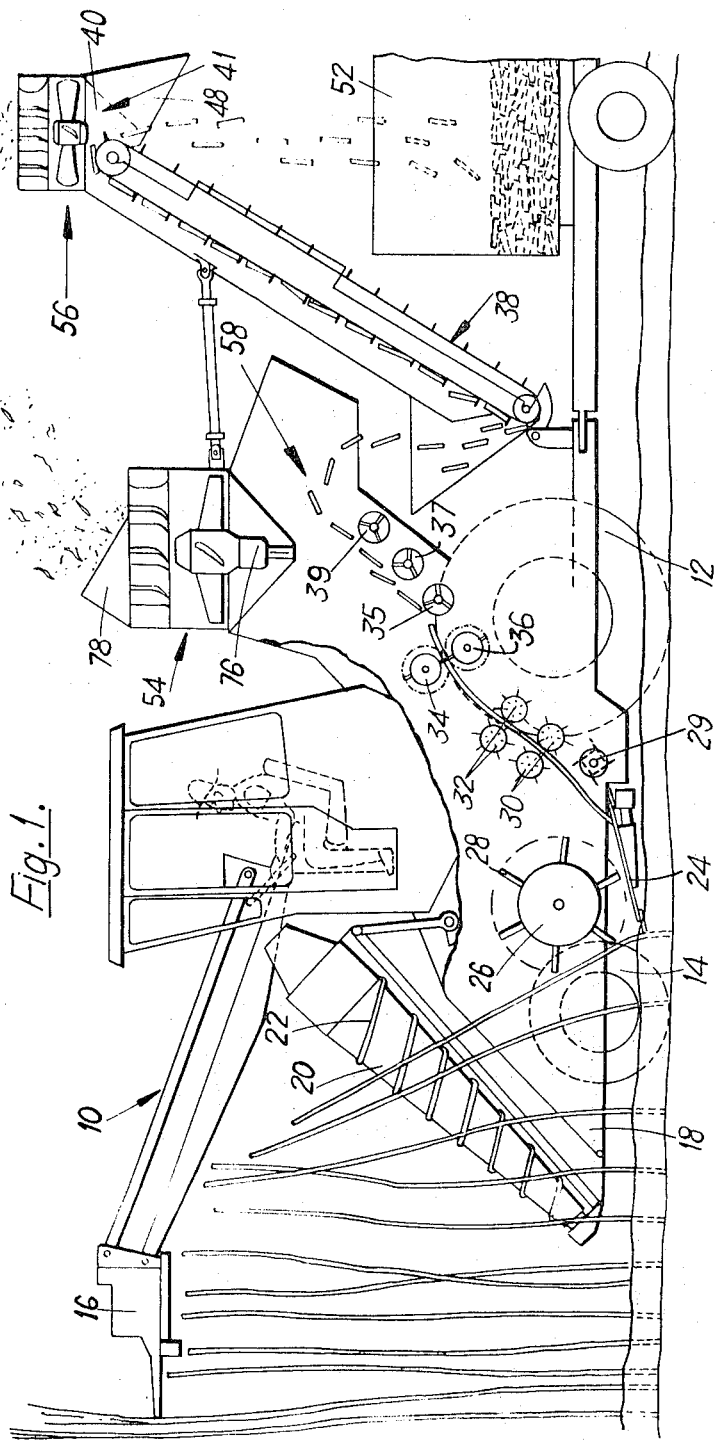
FIG. 1 shows, diagrammatically, a cane harvester in side elevation.

As shown in FIG. 1, a self-propelled cane harvester 10 comprises rear power driven ground wheels 12 and forward steerable wheels 14. The harvester includes a top cutting unit 16 constructed and arranged as described in our U.S. Pat. No. 3,596,447.

A pair of rearwardly converging gathering walls 18 defining a throat are provided at the forward end of the harvester. Each gathering wall is surmounted by a rotatable downwardly and forwardly extending frusto-conical crop lifter 20 having a helical feed element 22 thereon.

A pair of downwardly and forwardly inclined base cutter discs 24 arranged to rotate in opposite directions so as to feed the cane rearwards are provided in the throat defined by gathering walls 18. EAch base cutter disc carries six peripheral blades.

Above the base cutter discs there is provided a rotatable transverse feed roller 26 having axially extending paddles 28 at its outer periphery. A rotatable butt lifter roller 29 is provided behind the base cutter discs.

Rearwardly of butt lifter roller 29 are provided two pairs of rotatable feeding and cleaning rollers 30, 32 to remove stones and dirt from the cane as it is conveyed rearwardly.

A pair of rotatable chopper drums 34, 36 having co-operating cane chopping blades are provided behind the cleaning rollers 30, 32. This cane chopping apparatus is of the kind described in U.S. Pat. No. 3,141,281.

An overshot conveyor comprising three spaced apart power driven transverse flipper rollers 35, 37, 39 is provided to convey rearwardly the cane billets emerging from chopper drums 34, 36. Each roller has three cane-engaging axially-extending paddles.

A rearwardly and upwardly extending elevator 38 extends from a position rearwardly of and below flipper roller 39 to an elevated cane discharge housing 40. The elevator is in the form of a scraper conveyor comprising transversely spaced chains 42 (see FIG. 2) and transverse scraper bars 44 arranged to move over a support surface 46. A hood 48 directs the cane billets from elevator 38 into a wagon 52 towed by the harvester.

To remove trash from the chopped cane, first and second trash extraction assemblies 54, 56 are provided. The trash extraction assemblies are each similar to the other, comprising a fan arranged to rotate about a substantially vertical axis within a vertical trash extraction duct. The assembly 54 removes trash from the cane billets as they cascade over flipper rollers 35, 37, 39 through a trash extraction zone 58 between the chopper drums 34, 36 and the forward end of elevator 38. The assembly 56 removes trash from the cane as the billets cascade off the rear end of elevator 38 through a second trash extraction zone.

Because the two trash extraction assemblies are similar in construction, only one will be described in detail.

Referring to FIG. 2, the trash extractor 56 comprises an extractor fan having three blades 58 and arranged to be driven at approximately 1,200 r.p.m. about a vertical axis by a hydraulic motor 60.

Motor 60 is supported within a cylindrical trash extraction duct 62 by three radial arms 64 through one of which passes the hydraulic supply line for the motor. The lower end of duct 62 opens into the housing 40 enclosing the top end of elevator 38.

Surmounting duct 62 there is provided air flow control apparatus in accordance with the invention. The air flow control apparatus comprises a cylindrical duct 68 formed integrally with the duct 62 and having a series of air guide members or vanes 70 welded therein at equally circumferentially spaced positions around the internal periphery thereof so as to intercept the air flow produced by the fan.

Each vane 70 tapers to a point at its lower end 72, whereby trash wrapping is avoided and has an air guide surface 74 facing in the opposite direction to the direction of rotation (clockwise as seen from above) of the fan blades 58. The vane is smoothly curved so that the air guide surface is generally parallel to the axis of ducts 62, 68 at its upper end but is inclined at an oblique angle thereto at its lower end. Eight identical vanes 70 are provided.

It will be noted that in trash extractor 54, the fan is driven through a gearbox 76 mounted below it. Also a cowl 78 is provided to give a controlled rearward inclination to the otherwise vertical trajectory of the air blast from the fan.

In use, the harvester operates as follows. Cane is guided into the harvester's throat by the walls 18. Fallen cane is lifted by the crop lifters 20. The cane is cut at its base by the base cutters 24, fed butt first by rollers 26 and 29 to feeding and cleaning rollers 30, 32 and from thence between chopper drums 34, 36.

The cane billets cascade from the choppers over flipper rollers 35, 37, 39 and through a first trash removal zone 58 where extractor 54 removes trash and directs it upwardly and, by virtue of cowl 78, rearwardly. The cane billets land on the bottom of elevator 38 and are carried to housing 40 where they cascade through a second trash removal zone into the trailer 52. Extractor 56 removes trash from this cascade and directs it vertically.

Advantages of the embodiment described above include an improvement in fan efficiency arising from the presence of the vanes 70, and the controlled upward direction of trash whereby heavy bodies, such as stones, in the trash are less likely to cause injury. Also, light trash is less prone to fall onto elevator 38 whereby the cane cleaning efficiency of the harvester is improved.

Among modifications of the above embodiment which nevertheless fall within the scope of the invention are alterations in the shape, number and method of mounting the vanes 70.

I claim:

1. A cane harvester having a trash removal zone and a cleaning mechanism for removing trash from cane pieces passing through the trash removal zone characterized by an axial flow fan mounted on the harvester adjacent to the trash removal zone for pulling air through the cane pieces passing through said trash removal zone, a duct mounted on the harvester with an inlet end adjacent to the axial flow fan for directing air and entrained trash away from the axial flow fan and a plurality of vanes mounted in the duct for reducing the rotational component of movement given to the air and entrained trash by the axial flow fan, each of said vanes including a portion which increases in width from near zero at the end of the vane toward the duct inlet to prevent trash entrained in the air from sticking on the vanes.

2. The cane harvester cleaning mechanism of claim 1 including a cowl mounted adjacent to the duct for deflecting the air and entrained trash leaving the duct.

3. The cane harvester cleaning mechanism of claim 1 wherein each of the vanes includes a helical portion.

* * * * *